(12) United States Patent
Kögel et al.

(10) Patent No.: US 7,649,755 B2
(45) Date of Patent: Jan. 19, 2010

(54) SWITCHED MODE POWER SUPPLY WITH SOFT START OPERATION

(75) Inventors: Reinhard Kögel, Brigachtal (DE); Jean-Paul Louvel, Brigachtal (DE)

(73) Assignee: Thomson Licensing, Boulogne-Billancourt (FR)

( * ) Notice: Subject to any disclaimer, the term of this patent is extended or adjusted under 35 U.S.C. 154(b) by 156 days.

(21) Appl. No.: 10/563,432

(22) PCT Filed: Jun. 29, 2004

(86) PCT No.: PCT/EP2004/007006

§ 371 (c)(1),
(2), (4) Date: Mar. 20, 2007

(87) PCT Pub. No.: WO2005/006525

PCT Pub. Date: Jan. 20, 2005

(65) Prior Publication Data

US 2007/0171687 A1    Jul. 26, 2007

(30) Foreign Application Priority Data

Jul. 7, 2003    (DE) ............................. 103 30 605

(51) Int. Cl.
*H02M 3/335* (2006.01)
*H02M 3/315* (2006.01)

(52) U.S. Cl. .............. 363/21.12; 363/21.16; 363/21.18; 363/21.11

(58) Field of Classification Search ............... 363/21.12, 363/21.16, 21.18, 21.11
See application file for complete search history.

(56) References Cited

U.S. PATENT DOCUMENTS

| 4,872,100 A | * | 10/1989 | Diaz ........................... 363/41 |
| 4,876,636 A |   | 10/1989 | Rilly et al. |
| RE34,462 E  | * | 11/1993 | Whittle ........................ 363/49 |
| 6,094,362 A |   | 7/2000  | Domingo |
| 6,724,642 B2| * | 4/2004  | Brkovic ................... 363/21.08 |

OTHER PUBLICATIONS

STMicroelectronics: "Current Mode PWM Controller UC3844" Online, pp. 1-11 Oct. 1998.
"High Performance Current Mode Controllers UC3844" Online, pp. 1-20.
Search Report Dated Sep. 14, 2004.

* cited by examiner

*Primary Examiner*—Bao Q Vu
(74) *Attorney, Agent, or Firm*—Robert D. Shedd; Harvey D. Fried; James McKenzie

(57) ABSTRACT

The switched mode power supply contains a transformer, which has a primary winding and at least one secondary winding, a switching transistor in series with the primary winding and a control circuit for controlling an output voltage of the switched mode power supply. The control circuit contains an oscillator, whose oscillation frequency can be set via a terminal, and which is coupled to a secondary winding of the transformer. The wiring for the terminal is connected such that the switched mode power supply starts up at a relatively low oscillation frequency once it has been connected, and, during operation when an additional voltage is supplied to the input via the secondary winding, the oscillation frequency of the switched mode power supply is increased. The terminal is connected in particular via a bandpass filter to a voltage generated by the secondary winding.

6 Claims, 2 Drawing Sheets

SWITCHED MODE POWER SUPPLY WITH SOFT START OPERATION

The invention is based on a switched mode power supply having a transformer, which has a primary winding and at least one secondary winding, a switching transistor in series with the primary winding, a driver stage and a control circuit for controlling an output voltage of the switched mode power supply. The control circuit in this case has an oscillator, which prescribes a frequency at which the switching transistor is switched on and off. Switched mode power supplies of this type are used, for example, in television sets, video recorders and settop boxes.

Appliances of this type usually use switched mode power supplies based on the flyback converter principle, which provide a large number of stabilized supply voltages on the output side. The control circuit is used to control one of the output voltages during operation by means of a control loop. The other output voltages of the switched mode power supply are also stabilized in this way. The control circuit in this case controls the switching transistor by means of a control signal such that the output voltage connected to the control loop is kept constant by means of, for example, pulse-width modulation (PWM) or by varying the frequency of the control signal for the switching transistor.

Integrated circuits (ICs) are often used as the control circuit and considerably simplify the design of a switched mode power supply. Circuits of this type usually contain circuits for control purposes, an oscillator, a driver stage for directly driving a switching transistor, circuits for generating internal operating voltages, and protection circuits. The protection circuits in this case often only function indirectly by, for example, the current through the switching transistor being monitored with the aid of a measurement resistor.

Figure 1:
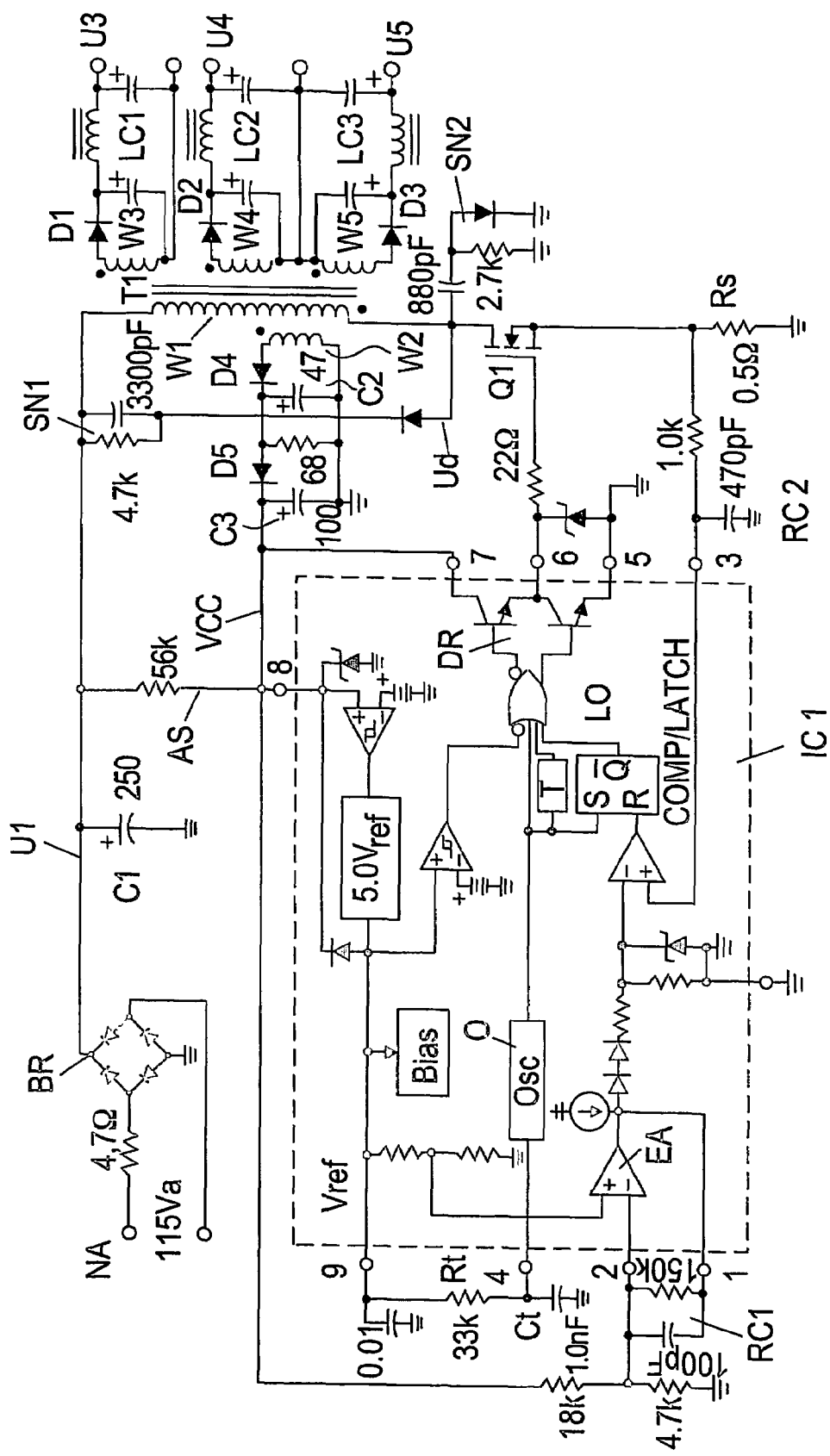

A switched mode power supply according to the prior art, which has an integrated circuit IC1, is illustrated in FIG. 1. The switched mode power supply uses, on the input side, a bridge rectifier BR, by means of which an AC voltage applied to a system terminal NA is rectified. The rectified voltage U1 is smoothed by means of a storage capacitor C1 and is applied to a primary winding W1 of a transformer T1. The transformer T1 brings about system isolation between the primary side and the secondary side and has, on the primary side, an auxiliary winding W2 for generating an operating voltage VCC for the integrated circuit IC1 and, on the secondary side, windings W3-W5 for generating stabilized output voltages U3-U5. Use is made of rectifier means D1-D3 to tap off rectified voltages at the windings W3-W5, which are then smoothed by means of bandpass filters LC1-LC3.

Connected in series with the primary winding W1 is a switching transistor Q1, in this exemplary embodiment a MOSFET, which is connected on the output side to ground via a measurement resistor Rs. The control input of the switching transistor Q1 is connected to a driver stage DR of an integrated circuit IC1 which is used to control the switching transistor Q1. The switched mode power supply is in the form of a flyback converter, with the result that, during operation when the switching transistor Q1 is on, energy is stored in the transformer T1 and is transferred to the windings W2-W5 in the subsequent Off phase of the switching transistor Q1.

The switched mode power supply has primary-side control which functions by means of the supply voltage VCC. The supply voltage VCC is generated during operation by the auxiliary winding W2, diodes D4, D5 and capacitors C2, C3. The supply voltage VCC is applied to a terminal 7 of the integrated circuit IC1, as a result of which the driver stage DR is supplied with voltage for operating the switching transistor Q1, and to a terminal 8, by means of which the integrated circuit IC1 generates internal reference voltages and stabilized supply voltages for operating its circuits. The supply voltage VCC is also applied to a fault amplifier EA in the integrated circuit IC1 by means of an RC filter RC1 and a terminal 2. The fault amplifier EA is used to keep the supply voltage VCC constant. As a result of this, the output voltages U3-U5 are also stabilized, since the windings W2-W5 are coupled to one another.

The integrated circuit IC1 may also be used for switched mode power supplies which are controlled on the secondary side. A switched mode power supply based on the flyback converter principle which has secondary-side output voltage control is described, for example, in U.S. Pat. No. 4,876,636, to which reference is made here. Improved voltage stabilization is achieved by means of secondary-side control. However, the control loop requires for this purpose a transformer, for example an optocoupler, by means of which the control signal is transmitted from the secondary side to the primary side.

The integrated circuit IC1 has an oscillator O, whose frequency can be set by means of it being connected externally to the terminal 4 by means of a resistor Rt and a capacitor Ct. The capacitor Ct is in this case charged via the resistor Rt by a reference voltage which is applied to the terminal 9 and is generated in the integrated circuit IC1. When the voltage across the capacitor Ct reaches a specific threshold value, said capacitor Ct is discharged by means of the integrated circuit IC1, with the result that a new charge cycle can then ensue.

The oscillator O prescribes the switching frequency for the driver stage DR, and the pulse width of the driver signal generated in the driver stage DR is varied using the fault amplifier EA and a downstream logic circuit LO, with the result that the output voltages of the switched mode power supply are stabilized.

The switched mode power supply also has a startup circuit AS, by means of which the integrated circuit IC1 is supplied with a current once the switched mode power supply has been connected. For the purpose of attenuating voltage peaks, connected to the switching transistor Q1 on the input side is a first attenuating network SN1, by means of which voltage peaks are passed on to the storage capacitor C1, and a second attenuating network SN2, which is connected in parallel with the switching transistor Q1.

The integrated circuit IC1 described with reference to FIG. 1 is, in this exemplary embodiment, a frequently used type UC3844 which can be procured, for example, from the company On Semiconductor (http://onsemi.com). Other controller ICs, such as MC33260, FA13843 and KA3843, for example, are also connected externally to a capacitor, by means of which the switching frequency of the switched mode power supply can be set.

The object of the present invention is to specify a switched mode power supply of the type mentioned initially which has a reliable protection circuit.

This object is achieved by the features specified in claim 1. Advantageous developments of the invention are specified in the subclaims.

The switched mode power supply according to the invention contains a transformer, which has a primary winding and at least one secondary winding, a switching transistor in series with the primary winding and a control circuit for controlling an output voltage of the switched mode power supply. The control circuit contains an oscillator, whose oscillation frequency can be set via a terminal, and which is coupled to a secondary winding of the transformer. The terminal is connected such that the switched mode power supply starts up at a relatively low oscillation frequency once it has been connected, and, during operation when an additional voltage is supplied to the terminal via the secondary winding, the oscillation frequency of the switched mode power supply is increased.

This circuitry has the following advantage: In the event of a short circuit, the voltages across the transformer break down, since all of the secondary windings are coupled to one another. The oscillation frequency and, as a result, the switching frequency of the switching transistor is then reduced depending on the type of short circuit until the oscillation frequency prescribed for connection purposes is reached. As a result, the switched mode power supply operates in the event of a short circuit at a reduced switching frequency, and remains in operation owing to the startup circuit, without components becoming overheated. If the short circuit only lasts for a short period of time, the switched mode power supply then returns to the normal mode of operation.

This circuitry also causes the switched mode power supply to start softly, resulting in the switched mode power supply being stepped up in a controlled manner once it has been connected, without certain components, such as the switching transistor, for example, being overloaded. The lower switching frequency in this case results in complete demagnetization of the transformer in each case during startup. Even when the transformer does not completely demagnetize in the event of a short circuit, the peak voltages of the diodes connected to the secondary windings are relatively low, since demagnetization is almost achieved owing to the low switching frequency. Owing to the low switching frequency in the event of a short circuit, the load on the switching transistor is in particular also considerably reduced.

In one preferred exemplary embodiment, the terminal of the oscillator is coupled, by means of a bandpass filter, with the secondary winding which has a time constant which is smaller than the period of the switching frequency of the switching transistor. The capacitor of the bandpass filter is as a result largely discharged again during one period. If the switched mode power supply is in a standby mode of operation, in which the switched mode power supply emits a small amount of power, the bandpass filter also obtains less power from the secondary winding. As a result, the bandpass filter supplies smaller voltage pulses to the terminal of the control circuit, with the result that the switched mode power supply runs at a lower switching frequency in the standby mode of operation and, as a result, is more efficient in this mode of operation.

According to the invention, the switching frequency of a switched mode power supply can therefore be considerably reduced in the event of a short circuit by using only few additional components. At the same time, this results in a defined soft-start behavior for the switched mode power supply, and the efficiency of the switched mode power supply is improved in the standby mode of operation.

The invention is particularly suitable for switched mode power supplies based on the flyback converter principle having an integrated circuit, for example so-called "current mode controllers", that may also be used in switched mode power supplies which are made up of discrete components.

Figure 2:
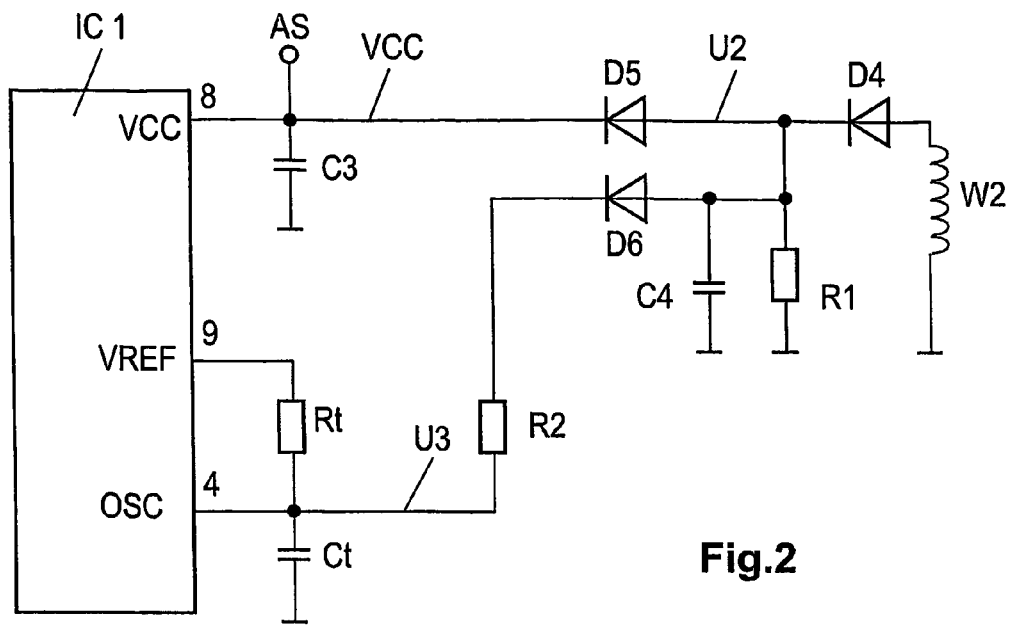
Figure 3:
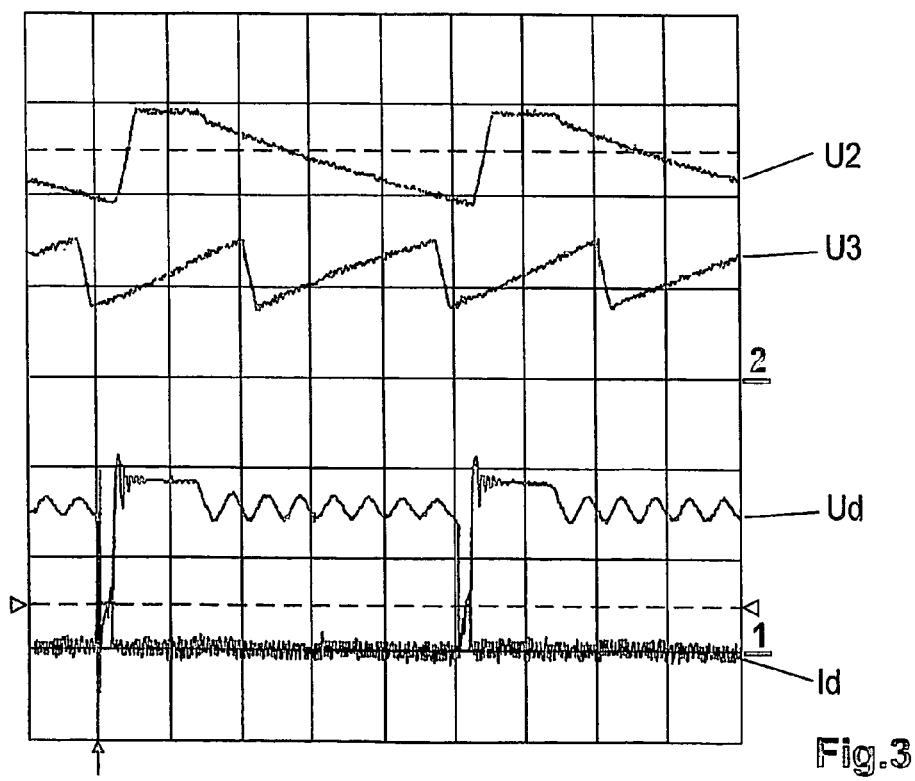

The invention is explained in more detail below by way of example with reference to schematic drawings, in which:

FIG. 1 shows a switched mode power supply having an integrated circuit according to the prior art, FIG. 2 shows additional circuitry according to the invention for the switched mode power supply according to FIG. 1, and FIG. 3 shows voltage and current characteristics for the switched mode power supply in the standby mode of operation according to FIG. 2.

FIG. 2 shows a detail of a switched mode power supply which has an integrated circuit IC1 and a transformer having a secondary winding W2. The integrated circuit IC1 and the transformer, as well as the further circuitry for the switched mode power supply, correspond to the switched mode power supply according to FIG. 1, insofar as no other is specified. The further circuitry has been omitted for clarity. The same reference numerals are used for identical components.

Connected to the secondary winding W2 is a first diode D4 which provides, via a further diode D5 and a capacitor D3, the operating voltage VCC for the integrated circuit IC1. The startup circuit AS is also connected to the capacitor C3.

The integrated circuit IC1 has a terminal 9, by means of which a reference voltage is provided during operation, and a terminal 4, by means of which the oscillation frequency of the internal oscillator can be set. Connected to the terminal 4 is a capacitor Ct which is charged via a resistor Rt by the reference voltage applied to the terminal 9. When the voltage across the capacitor Ct reaches a specific value, the capacitor Ct is discharged by means of the integrated circuit IC1, with the result that, during operation, a saw-tooth voltage is applied to the terminal 4.

The values for the resistor Rt and the capacitor Ct are in this case selected according to the invention such that they prescribe a comparatively low oscillation frequency, for example 1 kHz, in order for complete demagnetization of the transformer to occur in each switching cycle of the switching transistor once the switched mode power supply has been connected. The values are selected in particular such that the oscillation frequency is below a frequency of 16 kHz in the event of a short circuit, which is considered to be the minimum switching frequency for a switched mode power supply, since clearly audible noises are produced in the switched mode power supply in this frequency range.

The capacitor Ct which is connected to the terminal 4 is also connected to a rectified voltage U2 generated by the secondary winding W2 during the normal mode of operation, with the result that, during operation of the switched mode power supply, the capacitor Ct is also charged, as a result of which the oscillation frequency is increased. The rectified voltage U2 is in this case tapped off after the first diode D4. A bandpass filter, in this exemplary embodiment an RC filter having a resistor R1 and a capacitor C4, is in particular connected between the diode D4 and the diode D5. The time constant for the bandpass filter is in this case selected such that it is smaller than the period of the switching frequency of the switching transistor, with the result that the capacitor C4 is largely discharged again by means of the resistor R1 during the On phase of the switching transistor. The voltage U2 generated by the bandpass filter is, as a result, a pulsating DC voltage, whose pulse width is determined during the normal mode of operation in particular by the period of time for which the switching transistor is switched on.

The voltage U2 can therefore be used for generating the operating voltage VCC via the diode D5. In addition, it is also applied, decoupled via a diode D6, to the input 4 of the integrated circuit IC1, as a result of which the oscillation frequency of the oscillator of the integrated circuit IC1 is increased. In this case, the additional charge current for the capacitor C4 can be set via a resistor R2. In one preferred exemplary embodiment, the values for the capacitors and resistors shown in FIG. 2 are selected such that the oscillation frequency is 3 kHz when the voltage U2 is zero, i.e. once the switched mode power supply has been connected, and is 23 kHz during the normal mode of operation. The following values were used: R1: 2.2 kΩ, C4: 47 nF, R2: 15 kΩ, Rt: 100 kΩ, Ct: 10 nF.

The circuit operates as follows: Once the switched mode power supply has been connected, the capacitor C3 is charged by the startup circuit AS, with the result that an operating voltage VCC is produced for the IC1. At a specific voltage, the integrated circuit IC1 begins to operate and first of all generates internal operating voltages for the internal logic, as well as the reference voltage across the terminal 9 for operating the internal oscillator. Once the switched mode power supply has been connected, the oscillation frequency is therefore determined solely by resistor Rt and capacitor Ct, since the voltage U2 is still zero.

When the oscillator is in operation, as are the other circuits in the integrated circuit IC1, the internal driver stage for operating the switching transistor Q1, see FIG. 1, is activated. As a result, voltages are built up across the secondary windings of the transformer T1, and, in particular, the operating voltage VCC having the power required for operating the integrated circuit IC1 is produced across the secondary winding W2. Since the voltage U2 across the diode D6 and the resistor R2 is applied at the same time to the capacitor Ct, an additional charge current for the capacitor Ct is produced, with the result that the oscillation frequency increases. Since the voltages across the secondary windings of the transformer increase only gradually once the switched mode power supply has been connected, since all of the output capacitors connected to the secondary windings must be charged, the pulsating charge current through the resistor R2 also only increases gradually. This results in a soft-start behavior, by means of which the switching frequency of the switching transistor Q1 is increased from 3 kHz to 23 kHz within a defined period of time.

If one of the output voltages generated by the transformer Tr1 is short-circuited, all of the voltages generated by the secondary windings drop, since the windings are coupled to one another. As a result, the voltage U2 also drops, with the result that the oscillation frequency of the integrated circuit IC1 also decreases. Since the time constant for the bandpass filter R1, C4 is smaller than the period of the switching frequency of the switching transistor, the oscillation frequency is switched over as quickly as possible, with the result that the components of the switched mode power supply are not overloaded in the event of a short circuit.

Since, in the event of a short circuit, the operating voltage VCC also drops, the integrated circuit IC1 is disconnected after a few switching cycles, corresponding to the capacitance of the capacitor C3. Since C3 is then charged again, however, via the startup circuit AS, periodic connection of the switched mode power supply results. If the short circuit only lasts for a short period of time, the switched mode power supply returns to the normal mode of operation.

FIG. 3 shows voltage and current characteristics for the switched mode power supply according to FIG. 2, which occur when the switched mode power supply is in the standby mode of operation. Illustrated here is the voltage U3 which represents the charge and discharge cycles of the capacitor C3. The integrated circuit IC1 uses two oscillation cycles of the internal oscillator for one switching cycle of the switching transistor Q1, with the result that the switching frequency of the switched mode power supply is half the oscillation frequency, as can be seen with reference to the voltage Ud applied to the current input of the switching transistor Q1.

The On phase of the switching transistor Q1, during which the voltage Ud is approximately 0 volts, is very short in the standby mode of operation, as can be seen from Ud. If the switching transistor Q1 is off, Ud increases steeply and remains, irrespective of a starting oscillation, at a constant voltage value until the magnetization of the transformer has decayed. During this period of time, the voltage U2 also has a constant voltage value.

If the magnetization has decayed, the transformer TR no longer supplies any output voltages, with the result that the voltage U2 drops corresponding to the time constant for the RC element R1, C4. The voltage Ud has an oscillation in this period of time up to the point in time at which the switching transistor Q1 is switched on again. The control current Id for the switching transistor Q1 has a rising component in the On phase of the switching transistor Q1. In the Off phase of the switching transistor Q1, the control current Id is equal to zero.

The integrated circuit IC1 used for the switched mode power supply shown in FIG. 2 is, in particular, the integrated circuit UC3844. Other ICs, in particular so-called current mode controllers, may also be used, however. The invention may also be used in discrete switched mode power supplies which have an oscillator having an input and a terminal, by means of which the oscillation frequency of the oscillator can be set. Further modifications of the invention are obvious to those skilled in the art. A switched mode power supply according to FIG. 2 may be used in particular for television sets, video recorders and settop boxes. However, it is not restricted to this field of application.

The invention claimed is:

1. A switched mode power supply comprising
   a transformer having a primary winding and at least one secondary winding,
   a first rectifier means coupled to said secondary winding for providing a rectified voltage,
   a switching transistor arranged in series with said primary winding, and
   a control circuit with a driver stage coupled to a control input of the switching transistor for controlling an output voltage, the control circuit comprising an oscillator with a terminal, to which a first capacitor is coupled and the control circuit providing a reference voltage for charging said capacitor for determining the oscillation frequency of said oscillator for a start-up, phase,
   a start-up circuit coupled to a second capacitor for providing an operating voltage for the control circuit,
   a third rectifier means coupled between said first rectifier means an the second capacitor for charging the second capacitor during operation of the switched mode power supply,
   wherein said terminal is further coupled via a resistor to said rectified voltage at a node between said first rectifier means and third rectifier means, for providing an additional charge current for said capacitor for increasing the oscillation frequency of the oscillator during operation, with regard to the start-up phase.

2. The switched mode power supply as claimed in claim 1, wherein said terminal is connected via a low-pass filter to said first rectifier means.

3. The switched mode power supply as claimed in claim 2, wherein the low-pass filter has a time constant which is smaller than the period of the switching frequency of the switching transistor.

4. The switched mode power supply as claimed in claim 1, wherein the control circuit is arranged in an integrated circuit.

5. The switched mode power supply as claimed in claim 1, wherein said secondary winding is connected via the first rectifier means to a low-pass filter for the purpose of generating a rectified pulsed voltage during the normal mode of operation, and in that the rectified pulsed voltage is connected via a second rectifier means and the resistor to said terminal of the control circuit.

6. The switched mode power supply as claimed in claim 1, wherein the control circuit is integrated in an integrated circuit, which acts as a current mode controller and is coupled to a measurement resistor connected in series with the switching transistor.

* * * * *

UNITED STATES PATENT AND TRADEMARK OFFICE
CERTIFICATE OF CORRECTION

PATENT NO. : 7,649,755 B2  Page 1 of 1
APPLICATION NO. : 10/563432
DATED : January 19, 2010
INVENTOR(S) : Kögel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this

Twenty-third Day of November, 2010

David J. Kappos
*Director of the United States Patent and Trademark Office*